US006616209B1

(12) United States Patent
Muyo

(10) Patent No.: US 6,616,209 B1
(45) Date of Patent: Sep. 9, 2003

(54) ATTACHMENT TO A VEHICLE SUN VISOR

(76) Inventor: Roland Muyo, 274 Belmont Ave., Los Angeles, CA (US) 90026

(*) Notice: Subject to any disclaimer, the term of this patent is extended or adjusted under 35 U.S.C. 154(b) by 0 days.

(21) Appl. No.: 10/167,562

(22) Filed: Jun. 11, 2002

(51) Int. Cl.[7] .................................................. B60J 3/02
(52) U.S. Cl. ..................................... 296/97.6; 296/97.4
(58) Field of Search .............................. 296/97.1, 97.4, 296/97.6, 97.8, 97.9, 97.11; 160/DIG. 3

(56) References Cited

U.S. PATENT DOCUMENTS

| | | |
|---|---|---|
| 3,853,370 A | 12/1974 | Barnhart |
| 4,323,275 A | 4/1982 | Lutz |
| 4,792,176 A | 12/1988 | Karford |
| 5,259,657 A | 11/1993 | Arendt et al. |
| 5,466,029 A | 11/1995 | Zetterlund |
| 5,470,122 A * | 11/1995 | Feng .......................... 296/97.6 |
| 5,921,607 A * | 7/1999 | Brooks, II et al. ......... 296/97.6 |

* cited by examiner

Primary Examiner—D. Glenn Dayoan
Assistant Examiner—Jason Morrow
(74) Attorney, Agent, or Firm—James E. Brunton

(57) ABSTRACT

A sun visor attachment for use in motor vehicles which can be easily affixed to a vehicle sun visor and uniquely includes a first extender member that can be quickly and easily vertically adjusted relative to the sun visor to block light rays entering the vehicle windshield proximate the upper and lower central portion thereof and a second extender member that can be easily adjusted horizontally relative to the sun visor to block light rays entering the vehicle through the areas on either side of the sun visor. The vertical movement of the first extender member is precisely controlled through the use of a novel, manually operated adjustment mechanism that includes a finger operated adjustment knob that can be easily operated by the vehicle operator.

14 Claims, 4 Drawing Sheets

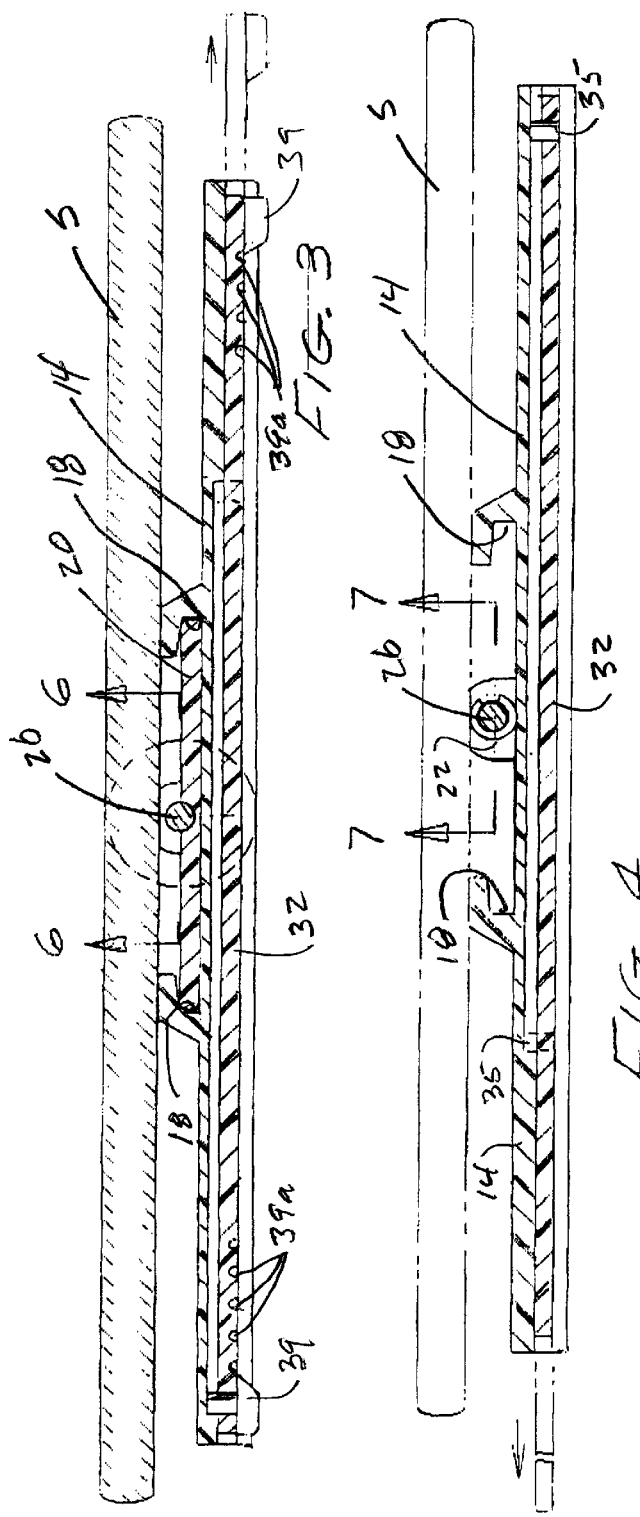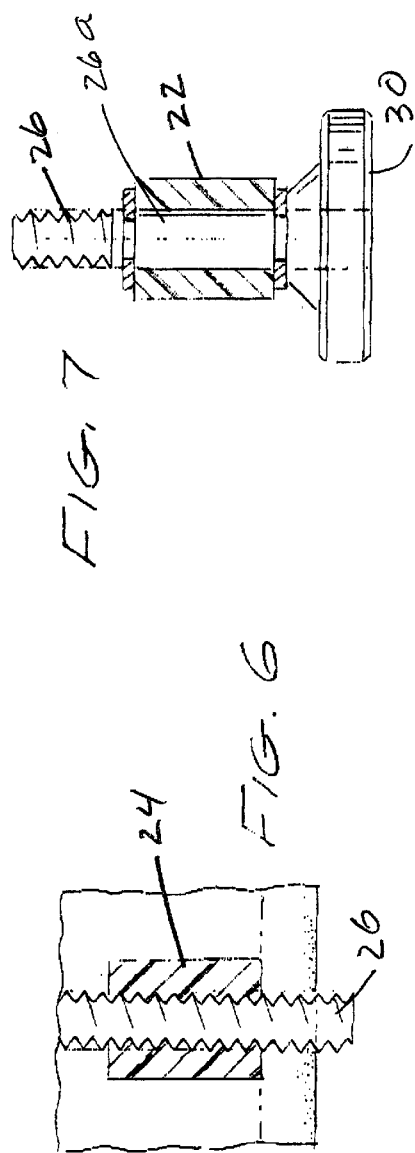

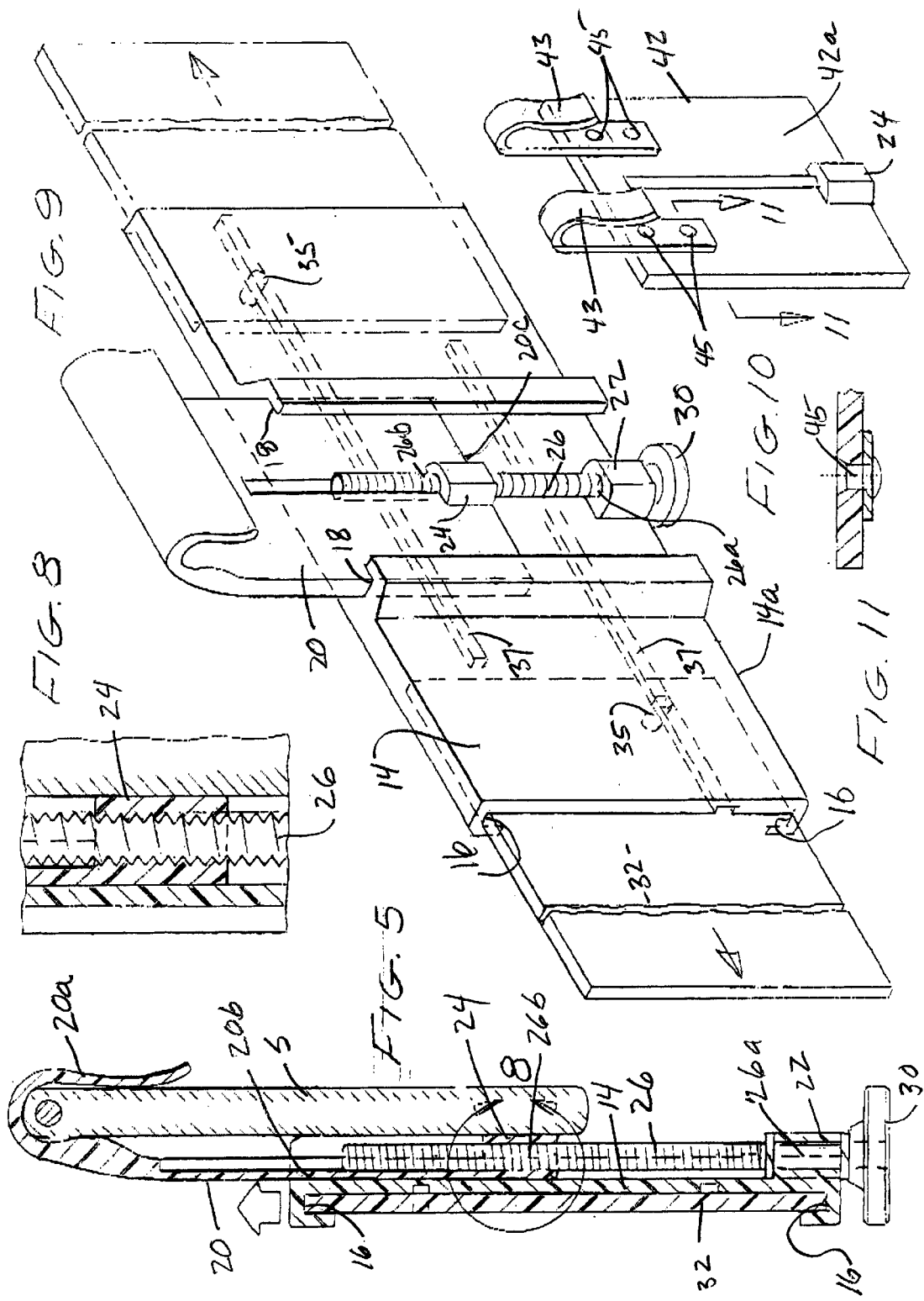

ATTACHMENT TO A VEHICLE SUN VISOR

BACKGROUND OF THE INVENTION

Field of the Invention

The present invention relates generally to attachments for sun visors for automobile, trucks and like motor vehicles. More particularly, the invention concerns a multiple position, adjustable sun visor attachment that includes a first extender member that is vertically adjustable relative to the sun visor by means of a manual adjustment mechanism and a second extender member that is horizontally adjustable relative to the first extender member.

DISCUSSION OF THE INVENTION

A number of different types of sun visor attachments have been suggested in the past. Typically the prior art sun visors are designed so that they can be attached to the vehicle sun visor to intercept light rays which interfere with the driver's vision. For example, U.S. Pat. No. 4,792,176 issued to Karford, discloses a visor extension unit that includes a lateral visor extension panel which is movable through a horizontal guide passage in the visor extension unit so as to effectively increase the windshield area blocked on either side of the sun visor as desired and a glare shield that is movable through a separate pocket formed in the extension unit in a downward direction beneath the sun visor. Lutz, U.S. Pat. No. 4,323,275 describes a housing attached to and swingable with a vehicle sun visor that accommodates primary, secondary and tertiary auxiliary visors that are selectively withdrawable through appropriate housing slots into extended positions leftward of, rightward of, and downward of the housing, respectively. Somewhat similar types of sun visor attachments are described in U.S. Pat. No. 5,466,029 issued to Zetterlund, U.S. Pat. No. 5,259,657 issued to Arendt et al., and in U.S. Pat. No. 3,208,792 issued to Martin.

Unlike the prior art devices, the sun visor attachment of the present invention provides an easy-to-use sun visor attachment that uniquely comprises a first extender member having a first pair of spaced apart, generally horizontally extending guide ways and a second pair of spaced apart, generally vertically extending guide ways; a connector member for interconnecting the first extender member with the sun visor, a manually operated adjustment means connected to the connector member for controllably adjusting the position of the first extender member relative to the connector member; and a second extender member slidably received within the first pair of spaced apart guide ways for movement between first and second positions. As will be better appreciated from the discussion that follows, the manually operated adjustment means of the invention permits the precise, manual adjustment of the position of the first extender member and positively prevents any undesirable, accidental movement of the first extender member downwardly of the sun visor. This novel safety feature of the attachment of the present invention is nowhere described or suggested by the prior art known to the inventor.

The visor attachment of the present invention is of a simple, easy-to-use construction and can be used with any standard vehicle visor. Advantageously, the visor attachment can be quickly attached to a standard vehicle visor without the need for any type of hand tools.

SUMMARY OF THE INVENTION

It is an object of the present invention to provide a sun visor attachment for use in motor vehicles which can be easily affixed to a vehicle sun visor and uniquely includes a first extender member that can be quickly and easily vertically adjusted relative to the sun visor to block light rays entering the vehicle windshield proximate the upper and lower central portion thereof and a second extender member that can be readily adjusted horizontally relative to the sun visor to block light rays entering the vehicle through the areas on either side of the sun visor.

A particular object of the invention is to provide a sun visor attachment of the aforementioned character in which the vertical movement of the first extender member can be precisely controlled through use of a novel, manually operated adjustment means that includes a finger operated adjustment mechanism that can be easily operated by the vehicle operator.

Another object of the invention is to provide a sun visor attachment that is pivotally movable with a vehicle sun visor.

Still another object of the invention is to provide a sun visor attachment as described in the preceding paragraphs that is of a simple construction of and can be interconnected with the vehicle sun visor without the use of any special tools.

Yet another object of the invention is to provide a sun visor attachment as described in the preceding paragraphs which has a minimum number of parts, is easy to use and is inexpensive to manufacture.

These and other objects of the invention will be realized by the sun visor attachment of the present invention, the details of which are described in greater detail in the paragraphs, which follow.

BRIEF DESCRIPTION OF THE DRAWINGS

FIG. 3 is a cross-sectional view taken along lines 3—3 of FIG. 1.

FIG. 4 is a cross-sectional view taken along lines 4—4 of FIG. 1.

FIG. 5 is a cross-sectional view taken along lines 5—5 of FIG. 1.

FIG. 6 is an enlarged, cross-sectional view taken along lines 6—6 of FIG. 3.

FIG. 7 is an enlarged, cross-sectional view taken along lines 7—7 of FIG. 4.

FIG. 8 is an enlarged view of the area designated in FIG. 5 by the numeral 8.

FIG. 9 is a generally perspective rear view of the visor attachment of the present invention.

FIG. 10 is a generally perspective view of an alternate form of connector component of the invention.

FIG. 11 is a cross-sectional view taken along lines 11—11 of FIG. 10.

DESCRIPTION OF THE INVENTION

Figure 1:
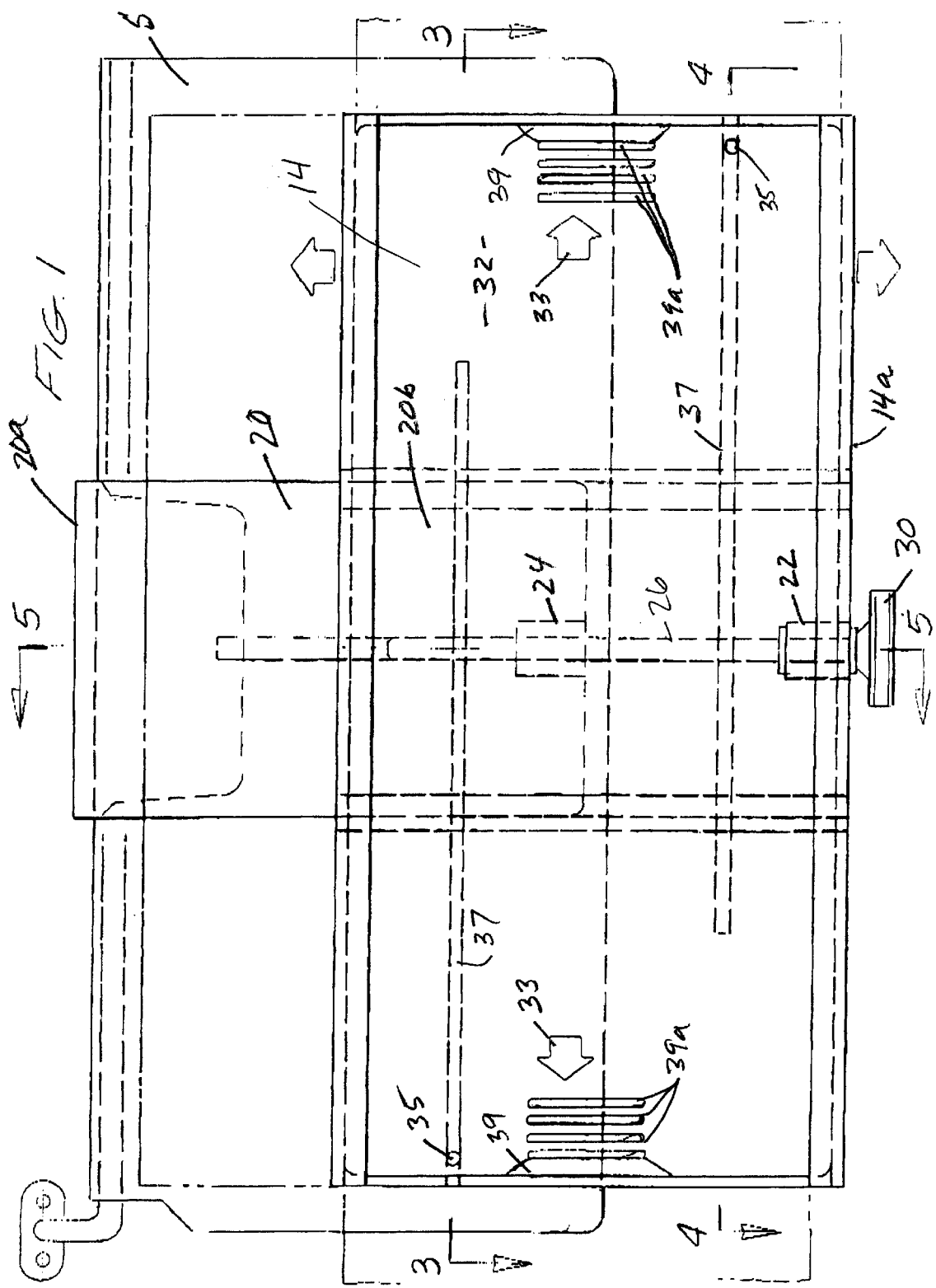
FIG. 1 is a front view of the visor attachment of the invention shown attached to a visor such as a visor found in an automobile.
Figure 2:
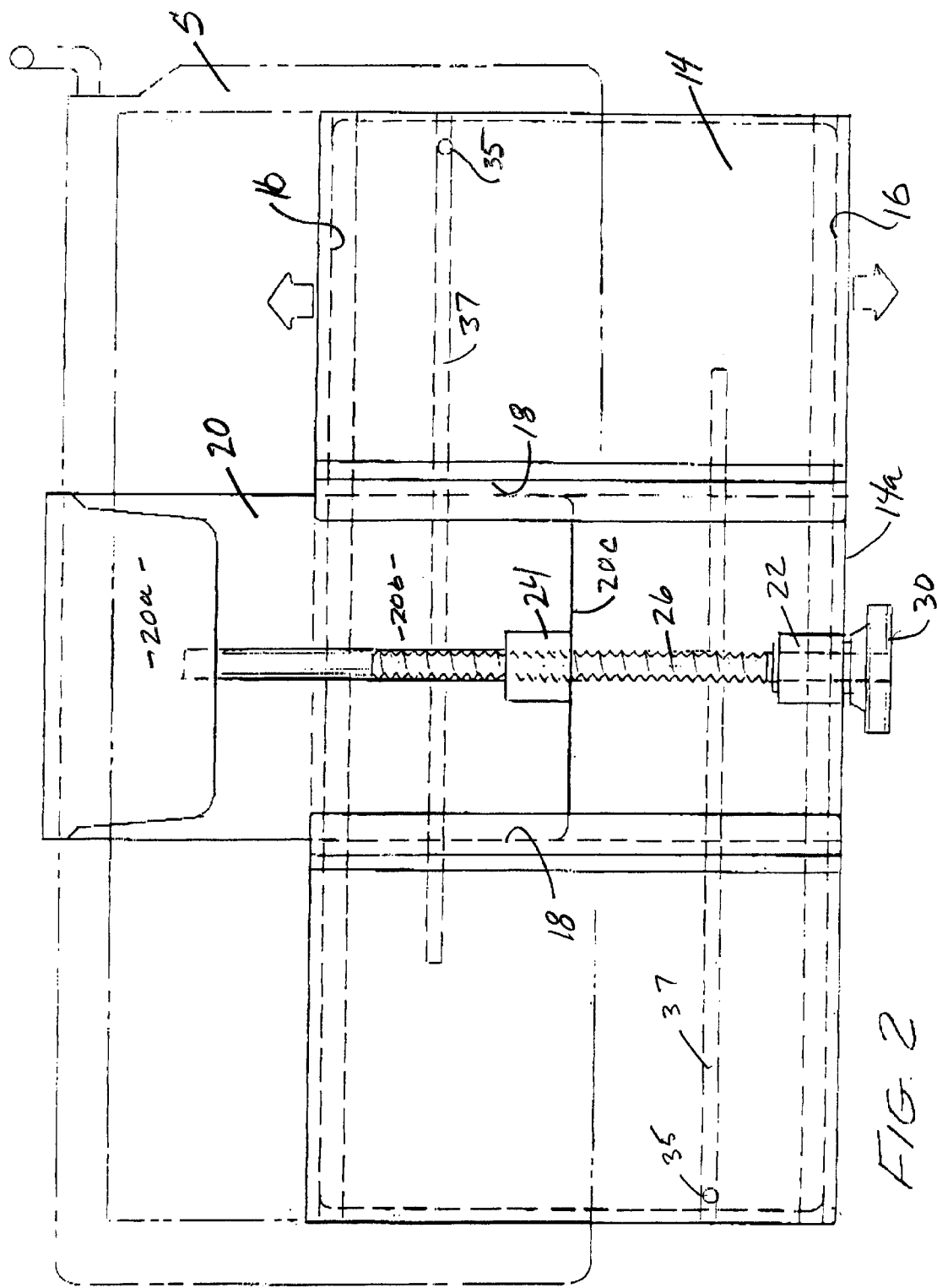
FIG. 2 is a rear view of the visor attachment shown in FIG. 1.

Referring to the drawings and particularly to FIGS. 1–9, one form of the attachment to a vehicle sun visor of the present invention is there illustrated. This form of the invention includes a first extender member 14 having a first pair of spaced-apart, generally horizontally extending guide ways 16 and a second pair of spaced-apart, generally vertically extending guide ways 18 (FIG. 9). Slidably receivable within second vertically extending guide ways 18 is a connector member 20 for interconnecting first extender member 14 with the sun visor "S" of the automobile (see FIG. 5). Connector member 20 has a generally U-shaped connector portion 20*a* and a generally planar body portion 20*b* that is slidably received within guide ways 18 in the manner shown in FIG. 9.

Forming an important aspect of the apparatus of the present invention is a manually adjustment means that is connected to the connector member for controllably adjusting the position of the first extender member 14 relative to the connector member 20 and relative to the sun visor "S". In the present form of the invention, this novel adjustment means comprises a hollow guide member 22 that is connected proximate the lower portion 14*a* of extender member 14 and an internally threaded member 24 that is connected to connector member 20 proximate the lower extremity 20*c* thereof. An elongated threaded shaft 26 has a first end portion 26*a* that extends through hollow guide member 22 (FIG. 7) and a second end portion 20*b* that is threadably received within internally threaded member 24 (FIGS. 6 and 8) for rotation with respect thereto. A finger gripping, head 30 is connected to the first end portion 26*a* of threaded shaft 26 in the manner shown in FIGS. 5 and 9. It is apparent from the drawings that by rotating the finger engaging member 30, the extender member 14 can be controllably raised and lowered relative to connector member 20 so as to controllably raise and lower the extender member relative to the sun visor "S" in the manner indicated by the arrow in FIG. 5. As previously mentioned, this novel, manually operated adjustment means prevents accidental lowering of the extender member due to vibration and the like and thereby provides a significant safety factor to prevent the extender member from accidentally moving into a lowered position wherein the driver's vision could be obstructed. However, when the driver wishes to raise or lower the extender member, he simply rotates the finger-engaging head 30 in a manner to precisely, incrementally move extender member 14 upwardly or downwardly relative to the sun visor "S".

Another important feature of the apparatus of the present invention is a second extender member 32 that is slidably received within first pair of spaced apart guide ways 16 for movement in the direction of the arrow 33 in FIG. 1 from a first position to a second position. As best seen in FIG. 9, second extender member 32 is provided with protuberances 35 that are slidably received within a pair of guide channels 37 formed in extender member 14. Second extender member 32 is also provided with gripping means for use in sliding the extender member within the first pair of spaced-apart guide ways 16. This gripping means is here provided in the form of a finger engaging protuberance 39 (FIG. 3) and a plurality of generally vertically finger engaging striations 39*a* of the character shown in FIGS. 1 and 3.

By imparting a force on the gripping means, the vehicle operator can easily slide the second extender member within horizontal guide ways 16 to a desired position. As indicated in FIG. 9, as the extender member is moved to the right or to the left by the vehicle operator, protuberances 35 formed on the extender member will smoothly ride within guide channels 37 provided in extender member 14.

Turning now to FIGS. 10 and 11, an alternate form of the visor attachment of the present invention is there illustrated. This attachment is similar in most respects to that previously described and illustrated in FIGS. 1–9 and accordingly like number are used in FIG. 10 to identify like components. The primary difference between this latest form of the invention and the earlier described invention resides in the construction of the connector member here designated by the numeral 42. The connector member in this latest form of the invention, rather than including a single U-shaped connector portion that is received over the visor here comprises a pair of spaced-apart, generally U-shaped, yieldably deformable connector members 43 that are receivable over the sun visor in the manner shown in FIG. 10. As shown in FIG. 10, this alternate form of connector member includes a planar member 42*a* to which connector members 43 are connected by means of connectors 45. Planar member 42*a* also carries the previously identified, internally threaded member 24, which threadably receives the elongated, threaded rod 26, the travel of which is guided by a hollow guide member 22.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following documents.

I claim:

1. An attachment for a vehicle sun visor comprising:
   (a) a first extender member having a first pair of spaced apart, generally horizontally extending guide ways and a second pair of spaced apart, generally vertically extending guide ways;
   (b) a connector member for interconnecting said first extender member with the sun visor, said connector member having a connector portion and a planar body portion slidably received within said second, generally vertically extending guide way;
   (c) a manually operated adjustment means connected to said connector member for controllably adjusting the position of said first extender member relative to said connector member, said manually operated adjustment means comprising a rotatable finger engaging member; and
   (d) a second extender member slidably received within said first pair of spaced apart guide ways for movement between first and second positions.

2. An attachment for a vehicle sun visor comprising:
   (a) a first extender member having a first pair of spaced apart, generally horizontally extending guide ways and a second pair of spaced apart, generally vertically extending guide ways;
   (b) a connector member for interconnecting said first extender member with the sun visor, said connector member having a connector portion and a planar body portion slidably received within said second, generally vertically extending guide way;
   (c) a manually operated adjustment means connected to said connector member for controllably adjusting the position of said first extender member relative to said connector member, said manually operated adjustment means comprising:
      (i) a hollow guide member connected to said extender member;
      (ii) an internally threaded member connected to said connector member; and
      (iii) an elongated threaded shaft having a first end portion extending through said hollow guide member and a second end portion threadably received within said internally threaded member for rotation with respect thereto; and (d) a second extender member slidably received within said first pair of spaced apart guide ways for movement between first and second positions.

3. The attachment as defined in claim 2 further including a finger gripping head connected to said first end portion of said elongated threaded shaft for use in imparting rotation to said shaft.

4. The attachment as defined in claim 2 in which said second extender member includes gripping means for use in sliding said second extender member within said first pair of spaced apart guide ways.

5. The attachment as defined in claim to 2 in which said connector portion of said connector member is generally U shaped in cross-section.

6. The attachment as defined in claim 2 in which said first extender member is provided with an elongated guide channel and in which said second extender member is provided with a guide protuberance that is slidably received within said guide channel.

7. An attachment for a vehicle sun visor comprising:
   (a) a first extender member having a first pair of spaced apart, generally horizontally extending guide ways and a second pair of spaced apart, generally vertically extending guide ways;
   (b) a connector member for interconnecting said first extender member with the sun visor, said connector member having a connector portion and a planar body portion slidably received within said second, generally vertically extending guide way;
   (c) a manually operated adjustment means connected to said connector member for controllably adjusting the position of said first extender member relative to said connector member, said manually operated adjustment means comprising:
      (i) a hollow guide member connected to said extender member;
      (ii) an internally threaded member connected to said connector member;
      (iii) an elongated threaded shaft having a first end portion extending through said hollow guide member and a second end portion threadably received within said internally threaded member for rotation with respect thereto; and
      (iv) a finger gripping head connected to said first end portion of said elongated threaded shaft for use in imparting rotation to said shaft;
   (d) a second extender member slidably received within said first pair of spaced apart guide ways for movement between first and second positions, said second extender member including gripping means for use in sliding said second extender member within said first pair of spaced apart guide ways.

8. The attachment as defined in claim 7 in which said first extender member is provided with a pair of elongated guide channels and in which said second extender member is provided with a pair of guide protuberances that are slidably received within said guide channels.

9. The attachment as defined in claim 7 in which said gripping means of said second extender member comprises a plurality of generally vertically extending, finger engaging striations.

10. An attachment for a vehicle sun visor comprising:
    (a) a first extender member having a first pair of spaced apart, generally horizontally extending guide ways and a second pair of spaced apart, generally vertically extending guide ways;
    (b) a connector member for interconnecting said first extender member with the sun visor, said connector member having a connector portion and a planar body portion slidably received within said second, generally vertically extending guide way;
    (c) a manually operated adjustment means connected to said connector member for controllably adjusting the position of said first extender member relative to said connector member, said manually operative adjustment means comprising:
       (i) a hollow guide member connected to said extender member;
       (ii) an internally threaded member connected to said connector member; and
       (iii) an elongated threaded shaft having a first end portion extending through said hollow guide member and a second end portion threadably received within said internally threaded member for rotation with respect thereto; and
    (d) a second extender member slidably received within said first pair of spaced apart guide ways for movement between first and second positions.

11. The attachment as defined in claim 10, further including a finger gripping head connected to said first end portion of said elongated threaded shaft for use in imparting rotation to said shaft.

12. The attachment as defined in claim 10 in which said second extender member includes gripping means for use in sliding said second extender member within said first pair of spaced apart guide ways.

13. The attachment as defined in claim 10 in which said connector portion of said connector member is generally U shaped in cross-section.

14. The attachment as defined in claim 10 in which said first extender member is provided with an elongated guide channel and in which said second extender member is provided with a guide protuberance that is slidably received within said guide channel.

* * * * *